United States Patent [19]
Ernst et al.

[11] Patent Number: 5,150,270
[45] Date of Patent: Sep. 22, 1992

[54] TRANSFORMER CIRCUIT AND METHOD WITH SATURATION PREVENTION

[75] Inventors: Leonard Ernst, Boonton; David Quam, Stanhope, both of N.J.

[73] Assignee: Dowty RFL Industries, Inc., Boonton, N.J.

[21] Appl. No.: 662,728

[22] Filed: Mar. 1, 1991

[51] Int. Cl.$^5$ .............................................. H02H 3/00
[52] U.S. Cl. ...................................... 361/64; 361/38; 323/357
[58] Field of Search ..................... 361/64, 35, 36, 38, 361/66, 68, 56, 18, 90; 323/358, 357

[56] References Cited

U.S. PATENT DOCUMENTS

| | | | |
|---|---|---|---|
| 2,154,020 | 4/1939 | Young | 171/119 |
| 2,560,170 | 7/1951 | Gray | 250/27 |
| 3,197,723 | 7/1965 | Dortort | 336/195 |
| 3,626,292 | 12/1971 | Gilbert | 324/140 D |
| 3,786,338 | 1/1974 | Gilbert | 323/48 |
| 4,180,841 | 12/1979 | Engel | 361/45 |
| 4,447,841 | 5/1984 | Kent | 361/18 |
| 4,471,355 | 9/1984 | Hardy et al. | 340/870.31 |
| 4,502,086 | 2/1985 | Ebisaka | 361/87 |
| 4,562,382 | 12/1985 | Elliott | 315/219 |
| 4,563,616 | 1/1986 | Stevens | 315/220 |
| 4,670,811 | 6/1987 | Eda | 361/45 |
| 4,745,391 | 5/1988 | Gajjar | 340/310 |
| 4,939,617 | 7/1990 | Hoffman et al. | 361/64 |

Primary Examiner—Steven L. Stephan
Assistant Examiner—Adolf Berhane
Attorney, Agent, or Firm—Martin M. Novack

[57] ABSTRACT

The disclosure is directed to a transformer circuit apparatus which receives an input signal and generates an output signal representative of the input signal. For example, the input signal may be an AC current, and the output signal to be generated may be a voltage that is proportional to the current. A transformer is provided, and has a core, a primary winding for receiving the input signal, a sense winding, and a feedback winding. A first circuit is coupled to the sense winding, and is responsive to the magnetic flux sensed by the sensed winding, for applying a signal to the feedback winding that tends to reduce the flux sensed by the sense winding. A feedback circuit is provided, and includes a low-pass filter, for feeding back a signal that depends on the output signal to the first circuit means. A circuit is provided for determining the presence of input signal offsets, and for generating offset indication signals in response thereto. A control means, responsive to the offset indication signals, is provided for controlling the low-pass filter. In the illustrated embodiment, there is disclosed current transformer circuit suitable for utilization in a protective relaying system. The low-pass filter includes a capacitor, and the circuit for controlling the low-pass filter includes a switch for discharging the capacitor, the switch being controlled by the offset indication signals. In this embodiment, the offset indication signals depend upon the time between zero-crossings of the input signal and the amplitude of the input signal. By discharging the capacitor in response to offsets at the input, the problem of saturating the input amplifier of the sense winding circuit is eliminated, and this permits use of a transformer core that need only be large enough to handle the small flux that is uncancelled by the feedback winding.

23 Claims, 4 Drawing Sheets

TRANSFORMER CIRCUIT AND METHOD WITH SATURATION PREVENTION

FIELD OF THE INVENTION

This invention relates to improvements in apparatus employing a transformer and, more particularly, to preventing saturation of the transformer core when there are substantial offsets at the transformer primary.

BACKGROUND OF THE INVENTION

There are various applications in which an input signal is applied to the primary of a transformer whose secondary is coupled to an output circuit that produces a signal having a specified relationship to the input signal. An example of such a circuit is a current transformer circuit employed in applications such as so-called protective relaying for power transmission lines.

AC power transmission lines are often protected by protective relaying systems which operate upon occurrence of a fault to trip circuit breakers that protect the transmission line from damage and isolate the faulted portion of transmission line from the rest of an overall transmission system. Typically, the section of transmission line to be protected extends between terminals called local and remote terminals, and substantially identical protective subsystems are located at the remote and the local terminals. Current on the transmission line (generally, on individual phases thereof) is sensed at both the local and the remote terminals, and information concerning the current is transmitted over a communications channel from the remote terminal to the local terminal, and vice versa. Each subsystem includes means for comparing the local and remote current readings and for generating trip control signals as a function of the comparison. The trip control signals operate, under certain conditions, to trip circuit breakers at the respective locations when the subsystems detect a condition that indicates an internal fault; i.e., a fault within the protected section of transmission line. A prior art protective relaying system is disclosed, for example, in U.S. Pat. No. 4,939,617, assigned to the same assignee as the present application.

The accurate sensing of current (typically, for each individual phase of the transmission line) is essential to proper performance of the protective relaying system. Each current transformer circuit operates to produce an output voltage that is proportional to the current in the current transformer primary winding. The output voltages are then used in subsequent processing for determination of the absence or presence of a fault, as previously described. The current transformers are required to operate over a wide range of current magnitudes and, when a fault occurs, a sharp exponentially decaying DC offset can result. If the transformer core isn't large enough to handle the flux that results from the offset, it will saturate. A substantial recovery time may then be needed before the transformer will again operate properly, and this could result in serious consequences in an application such as protective relaying, since the system will be effectively "blinded" until the transformer recovers. [As an example, in differential type protective relaying, should saturation occur at one station and not the other, or at both stations, an inaccurate signal comparison will be made and could result in a false trip in a thru-fault situation, or a failure to trip upon a line fault.] In extreme cases, the transformer could be permanently disabled.

The use of a large core can prevent the stated problem, but the attendant size, weight and cost are generally undesirable. Air gaps can make the core more resistant to saturation, but generally do not permit core size reduction. An approach to the core saturation problem which permits use of a relatively small core in certain applications has been to employ a flux cancellation circuit. In this approach, the transformer is provided with a primary winding, a sense winding, and a feedback winding. A sense winding circuit is responsive to the flux sensed by the sense winding and applies a signal to the feedback winding that tends to reduce the flux sensed at the sense winding. An output signal depends on the signal that is applied to the feedback winding and a feedback circuit feeds back the output signal to the sense winding circuit to provide stability. The feedback circuit includes a low-pass filter, which comprises an RC circuit. The circuit operates to reduce the flux in the transformer, but suffers a serious problem, as follows: A substantial current offset at the primary will cause a DC component in the feedback circuit that tends to saturate the input amplifier of the sense winding circuit. When this happens, control of the feedback loop is lost, the flux cancellation is not effective, and the transformer can saturate.

It is among the objects of the present invention to provide an improved circuit and method for preventing saturation of the core of a transformer when there are substantial offsets at the transformer primary.

SUMMARY OF THE INVENTION

The present invention is directed to a transformer circuit apparatus which receives an input signal and generates an output signal representative of the input signal. For example, the input signal may be an AC current, and the output signal to be generated may be a voltage that is proportional to the current. A transformer is provided, and has a core, a primary winding for receiving the input signal, a sense winding, and a feedback winding. A first circuit means (also referred to as a sense winding circuit) is coupled to the sense winding, and is responsive to the magnetic flux sensed by the sensed winding, for applying a signal to the feedback winding that tends to reduce the flux sensed by the sense winding. A feedback circuit means is provided, and includes a low-pass filter, for feeding back a signal that depends on the output signal to the first circuit means. Means are provided for determining the presence of input signal offsets, and for generating offset indication signals in response thereto. A control means, responsive to the offset indication signals, is provided for controlling the low-pass filter.

In an illustrated embodiment, the invention comprises a current transformer circuit suitable for utilization in a protective relaying system. The low-pass filter includes a capacitor, and the means for controlling the low-pass filter includes switch means for discharging the capacitor, the switch means being controlled by the offset indication signals. In this embodiment, the means for generating offset indication signals comprises means for producing signals that depend upon the time between zero-crossings of the input signal and the amplitude of the input signal.

By discharging the capacitor in response to offsets at the input, the problem of saturating the input amplifier of the sense winding circuit is eliminated, and this permits use of a transformer core that need only be large enough to handle the small flux that is uncancelled by the feedback winding.

Further features and advantages of the invention will become more readily apparent from the detailed description when taken in conjunction with the accompanying drawings.

DESCRIPTION OF THE PREFERRED EMBODIMENT

Figure 1:
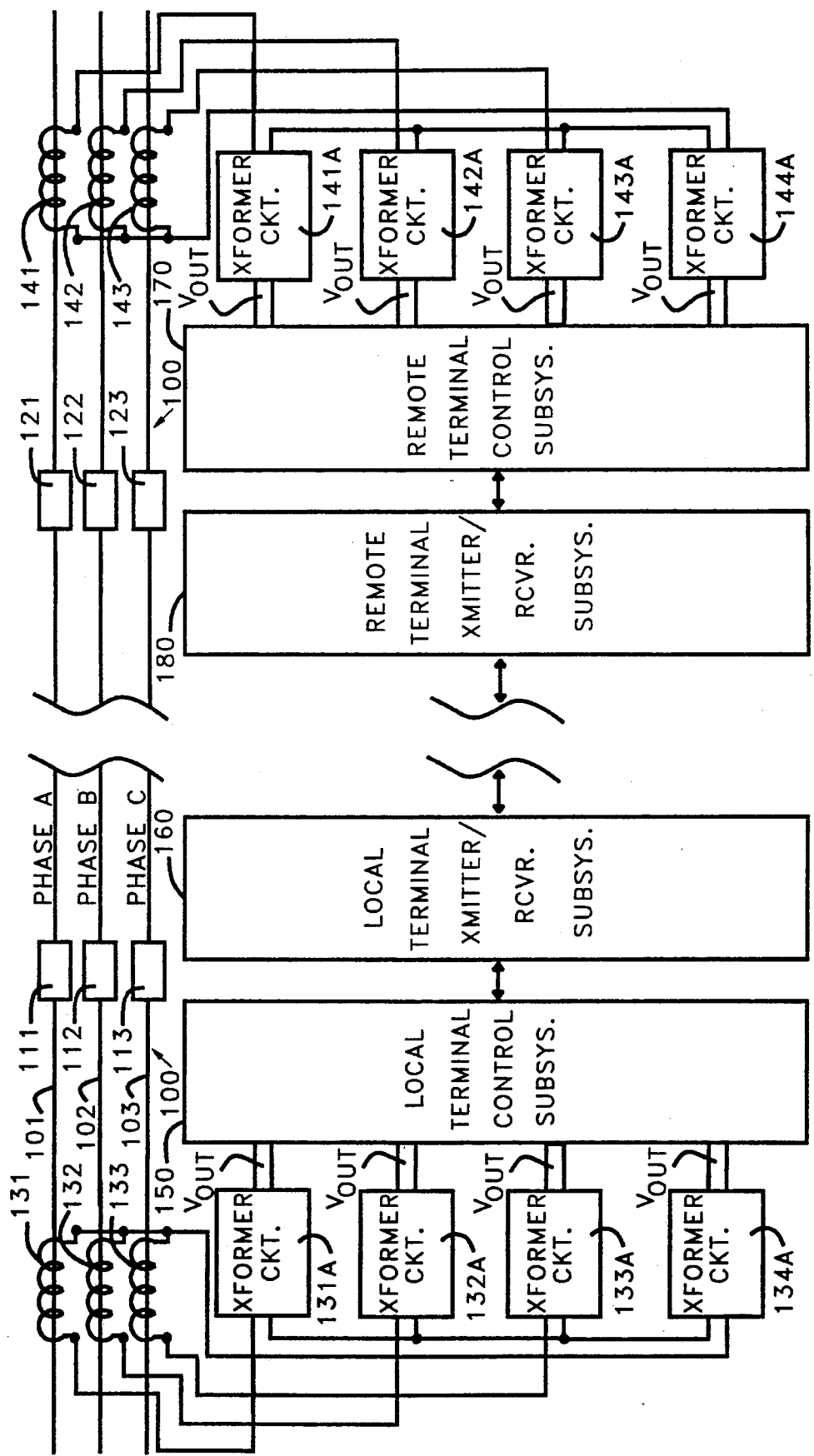
FIG. 1 is a block diagram, partially in schematic form, of an AC transmission line section which is being monitored and protected using a system that can include an embodiment of the invention.

Referring to FIG. 1, there is shown a diagram of an AC transmission line section 100 which, in the present example, is a three phase electrical network having individual transmission conductors 101, 102 and 103 which respectively carry phases A, B and C of the network. As in the abovereferenced U.S. Pat. No. 4,939,617, there is illustrated a two terminal system with the "local" (or "first") terminal shown on the left and a "remote" (or "second") terminal shown on the right. The section of transmission line between the local and remote terminals is protected, as in the abovereferenced Patent, with a system that utilizes circuit breakers designated 111, 112 and 113 for the local terminal, and 121, 122, and 123 for the remote terminal. The circuit breakers may be of any suitable construction and are well known in the art. Main current transformers 131, 132 and 133 are provided to sense current on conductors 101, 102 and 103, respectively, at the local terminal, and main current transformers 141, and 142 and 143 are provided to sense current on the conductors 101, 102 and 103, respectively, at the remote terminal. In the present embodiment, auxiliary current transformer circuits 131A, 132A and 133A are provided at the local terminal and are respectively coupled to the main current transformers, 131, 132 and 133, as shown, to obtain voltages (generally designated $V_{out}$) that are coupled to local terminal control subsystem 150. Similarly, auxiliary current transformer circuits 141A, 142A and 143A are provided at the remote terminal and are respectively coupled to the main current transformers 141, 142 and 143, as shown, to obtain voltages (also generally designated $V_{out}$) that are coupled to remote terminal control subsystem 170. The common returns of the main current transformers 131, 132 and 133 and the respective auxiliary transformer circuits 131A, 132A and 133A at the local terminal flow through a common (ground current) auxiliary transformer circuit 134A, which provides a voltage representative of total ground current to the local terminal control subsystem 150. Similarly, the common returns of the main current transformers 141, 142 and 143 and the auxiliary transformer circuits 141A, 142A and 143A at the remote terminal flow through a common (ground current) auxiliary transformer circuit 144A, which provides a voltage representative of total ground current to the remote terminal control subsystem 170. The local terminal control subsystem 150 is coupled with a local terminal transmitter/receiver subsystem 160. Similarly, the remote terminal control subsystem 170 is coupled with a remote terminal transmitter/receiver subsystem 180.

Briefly, as described in the referenced U.S. Pat. No. 4,939,617, in operation of the apparatus of FIG. 1, the current values [for each phase, and for ground current] sensed by the current transformer circuits at the local and remote terminals are time integrated between zero crossings to obtain signal parameter values that are stored in association with respective time indications. Signal parameter values are communicated between the local and remote transmitter/receiver subsystems (160 and 180, respectively), and are used to determine the status of the transmission line (100) being monitored. The status indications can be used, for example, as control signals to control the tripping of circuit breakers (111-113, and/or 121-123), as appropriate. Reference can be made to said U.S. Pat. No. 4,939,617 for further detail. The present invention relates to improvements in transformer circuits, such as the current transformer circuits 131A-134A and 141R-144R used in FIG. 1.

Figure 2:
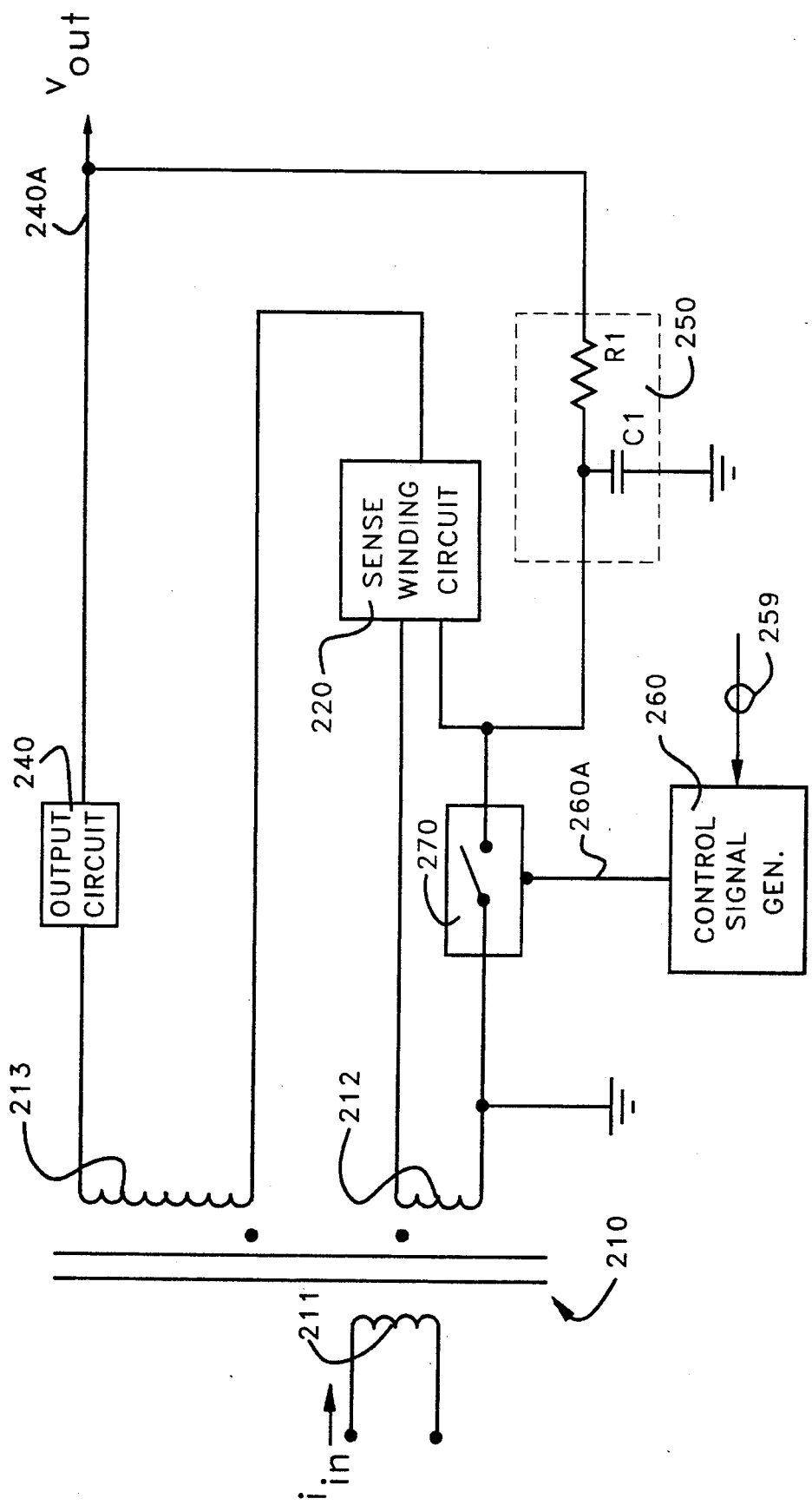
FIG. 2 is a block diagram, partially in schematic form, of a transformer circuit in accordance with an embodiment of the invention and which can be used to practice the method of the invention. The transformer circuit can be employed in the FIG. 1 system.

Referring to FIG. 2, there is shown a block diagram of an improved circuit in accordance with an embodiment of the invention. The circuit can be utilized as a current transformer circuit (e.q. 131A, or any of the other current transformer circuits 132A-134A or 141A-144A) of the FIG. 1 apparatus, and in various other transformer applications. A current transformer 210 is provided, and has a primary winding 211, a sense winding 212, and a feedback winding 213. An input current, $i_{in}$, such as a sampled current from a phase of the AC power transmission line of FIG. 1, is received by the primary winding. The sense winding 212 has one end coupled to ground reference potential, and its other end coupled to a sense winding circuit represented by the block 220. The output of sense winding circuit 220 is coupled to one end of the feedback winding 213, the other end of which is coupled to an output circuit represented by the block 240. The output of circuit 240 is utilized as an output signal 240A which, in the present embodiment, is a voltage $V_{out}$ that is representative of the input current, $i_{in}$. Proportionality is generally desirable in applications of this type. The output signal is also coupled to a feedback circuit 250 which is coupled back to sense winding circuit 220 and is represented in FIG. 2 as including a low-pass filter that comprises a series resistor R1 and a capacitor C1 coupled between an end of resistor R1 and ground reference potential. Signals 259, to be described, are received by a control signal generator circuit 260 to produce a control signal 260A that controls an electronic switch 270. The switch 270 is operative, when closed, to couple the capacitor C1 to ground reference potential for a duration that depends upon the duration of the control signal 260A. In the present embodiment, the signals 259 are available in the local terminal control subsystem 150, as described in the U.S. Pat. No. 4,939,617, which is incorporated herein by reference. [They are also, of course, available in the substantially identical remote terminal control subsystem 170 for the associated transformer circuits.] The signals 259 include an indication of the time between successive zero crossings, or a signal derived therefrom. If the half-cycle time is outside a predetermined range, (e.g. 7.5 ms to 9.0 ms, for a nominal 60 Hz) there is a likelihood of a power line disturbance with a substantial DC component, so a half-cycle duration signal can be used, together with a measure of peak amplitude, to obtain an indication of a high probability of an offset of at least a given magnitude at the primary of transformer 210. When the condition is present, the control signal generator 260 (to be described in conjunction with FIG. 4) produces a control signal 260A that discharges capacitor C1 for a predetermined time (or sequence of times) to prevent the problem of saturation of the input amplifier of the sense winding circuit, as will be described further hereinbelow. It will be understood that other circuits can be utilized for generating an indication of offsets at the transformer primary.

Figure 3:
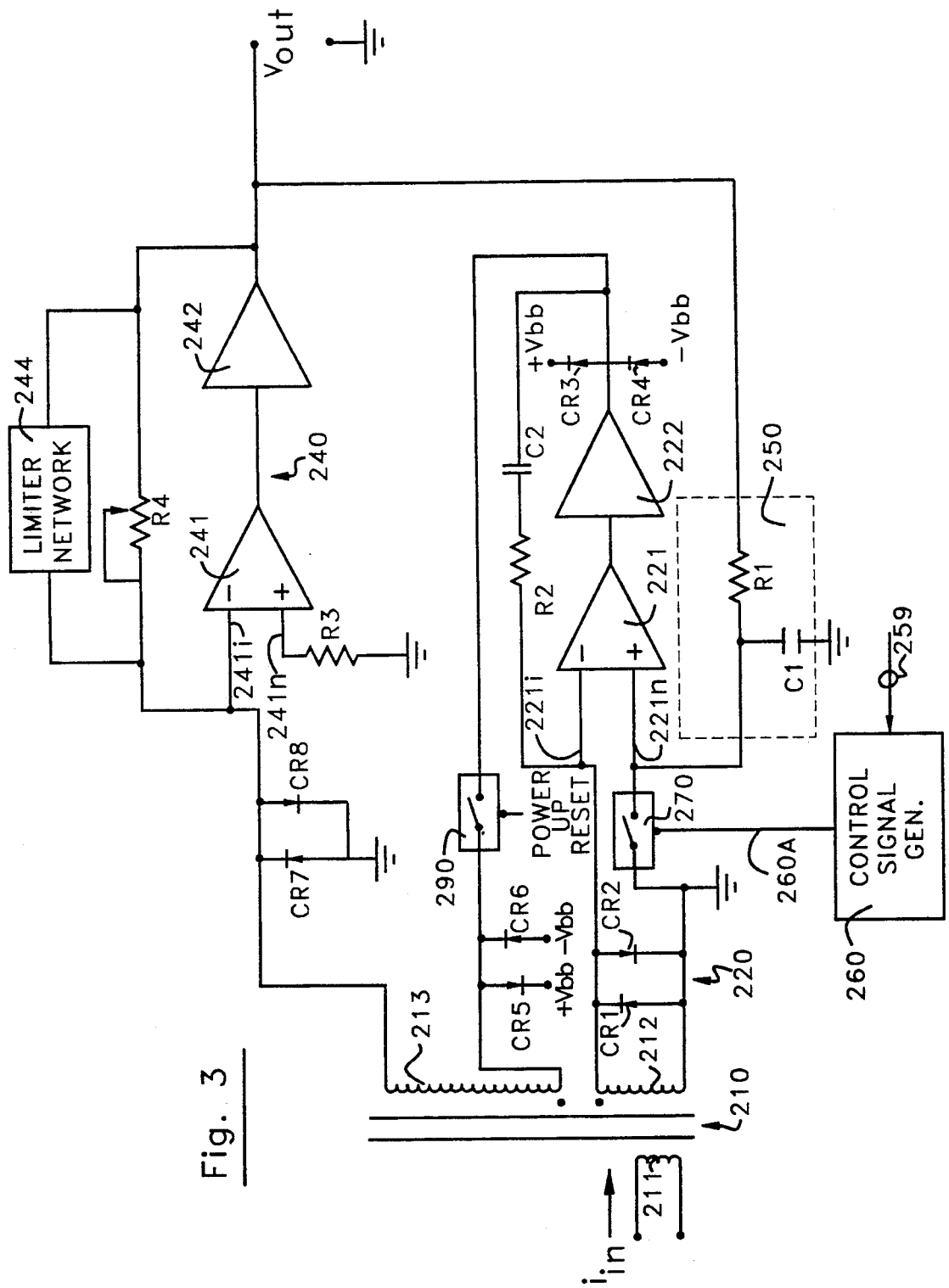
FIG. 3 is a schematic diagram, partially in block form, of the FIG. 2 circuit.

Referring to FIG. 3, there is shown a more detailed diagram of the FIG. 2 embodiment. The transformer 210 includes primary winding 211, sense winding 212, and feedback winding 213, as first shown in FIG. 2. The sense winding circuit 220 includes an operational amplifier 221 which may be, for example, an OP77 sold by Precision Monolithics Inc. of Santa Clara, Calif. The operational amplifier 221 has its inverting input terminal 221$i$ coupled to the ungrounded end of sense winding 212, and its non-inverting input terminal 221$n$ coupled to the junction between the resistor R1 and the capacitor C1 of the low-pass filter of feedback circuit 250. Protective diodes CR1 and CR2 are connected, with opposite polarity, between the inverting input of operational amplifier 221 and ground reference potential. The operational amplifier 221, and other amplifiers hereof conventionally have power supply pins (not shown) coupled to a power supply and have decoupling capacitors (not shown) coupled with the power supply pins. The output of operational amplifier 221 is coupled to the input of a buffer amplifier 222 whose output is protected, as shown, by coupling via diodes CR3 and CR4 to supply voltages $+V_{bb}$ and $-V_{bb}$. An AC feedback link, comprising capacitor C2 and resistor R2, is coupled between the output of buffer amplifier 222 and the inverting input 221$i$ of operational amplifier 221, and provides AC stability to the circuit. The output of buffer amplifier 222 is coupled, via analog switch 290, to one end of feedback winding 213, the other end of which is coupled to output circuit 240.

In the output circuit 240, the feedback winding 213 is coupled to the inverting input 241$i$ of an operational amplifier 241. The non-inverting input 241$n$ of operational amplifier 241 is coupled to ground reference potential via a resistor R3. Protective diodes CR7 and CR8 are coupled between ground reference potential and the inverting input 241$i$ of operational amplifier 241. The output of operational amplifier 241 is coupled to the input of a buffer amplifier 242. The output of buffer amplifier 242 is the previously indicated circuit output 240A (FIG. 2), and is also fed back to the inverting input 221$i$ of operational amplifier 241 by the parallel combination of variable resistor R4 and limiter network 244. The limiter network may comprise a zener diode bridge, and is operative to limit the output voltage to the range of interest.

The circuit of FIGS. 2 and 3 allows use of a small lighter-weight transformer core to perform a function that would ordinarily require a much heavier transformer, and operates without the previously described problem of saturation of the input amplifier by DC offsets. In an example, transformer 210 has a single turn primary winding 211, a 1000 turn sense winding 212, and a 4000 turn feedback winding 213. Of course, other numbers of turns and turn ratios can be used. Overall accuracy depends on the sense/feedback turns ratio, but not on the actual number of turns. The larger this ratio, the larger the error component and the larger the amount of uncancelled flux in the transformer core. There must be some uncancelled flux because, as is generally the case for a feedback control loop, a minimum error signal is needed in order to develop a feedback control signal. In operation, the sense winding circuit, which includes operational amplifier 221 and buffer stage 222, amplifies the signal developed across the sense winding 212. The output of buffer 222 provides a current that drives feedback winding 213 in a manner to reduce the signal on the sense winding to near zero. A small uncancelled flux remains, and the core selected for the transformer will only be required to handle this uncancelled flux without saturating.

The current required in the feedback winding is equal to the primary current multiplied by the primary/feedback turns ratio. The buffer amplifier 222 provides this current. The output stage, which includes operational amplifier 241 and buffer 242, acts to convert the feedback winding current into the output voltage signal $V_{out}$. Even though the limiter 244 controls the level of the output signal, the current through the feedback winding will continue to increase in a linear fashion. If this were not the case, the input transformer would saturate at the point where linear operation ceased. Resistor R4 is used to scale the system. Diodes CR1, CR2, CR7 and CR8 are used to protect the inputs of the amplifiers 221 and 241, respectively, against possible high voltages.

High voltage may exist in this circuit if DC power is removed from the amplifier stages while primary current continues to flow in the transformer 210. Analog switch 290, along with diodes CR3–CR6 are used to protect the output of the buffer 222 against this condition. When DC power is removed, the analog switch 290 will open, disconnecting the buffer stage output from the high voltage that can exist on the feedback winding. CR5 and CR6 will shunt the feedback winding voltage to ground to protect the analog switch. Resistor R2 and capacitor C2 provide frequency compensation for the input stage to protect against oscillations. Resistor R1 and capacitor C1 provide an overall DC-stabilizing feedback signal along with the low pass filtering required to remove the AC component of the output signal from the amplifier input.

Figure 4:
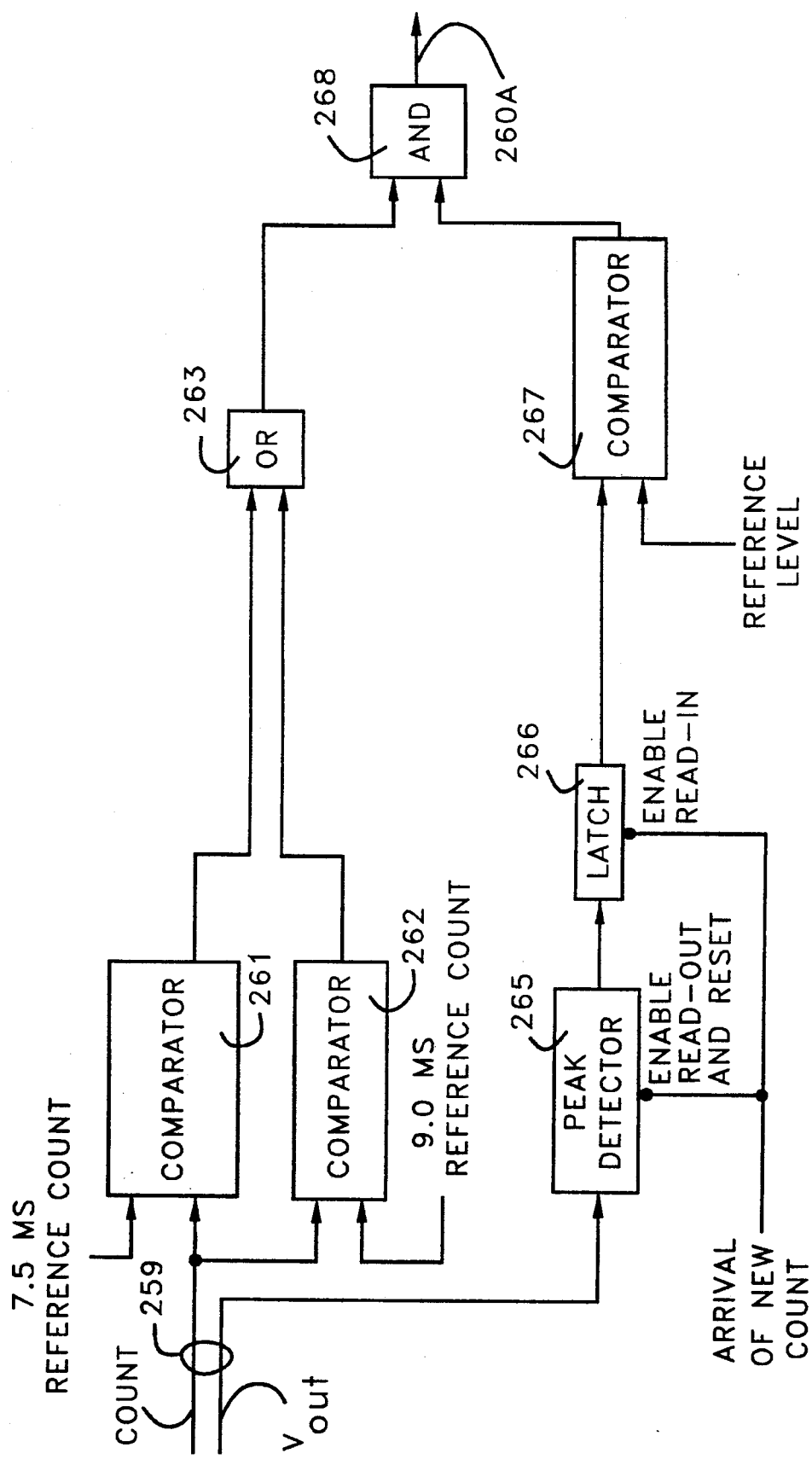
FIG. 4 is a block diagram of the control signal generator of the circuit of FIGS. 2 and 3.

Referring to FIG. 4, there is shown a block diagram of an embodiment of the circuit 260 for generating the control signal 260A that controls the switch 270 (FIGS. 2 and 3). At each zero crossing of the signal being monitored, the block 150 (FIG. 1) produces a count representative of the time elapsed since the previous zero crossing. This count is indicated as being available on one of the lines 259, and is coupled to comparators 261 and 262. The comparator 261 receives, as its other input, a reference signal that represent 7.5 ms, and is operative to produce an output when the received count represents less than 7.5 ms. The comparator 262 receives as its other input a reference signal representative of a count of 9.0 ms, and produces an output when the received count represents more than 9.0 ms. The outputs of comparators 261 and 262 are coupled to an OR gate 263 whose output is, in turn, one input to an AND gate 268. The other line 259 received by the circuit 260 is the output voltage $V_{out}$ (from output circuit 240), which is coupled to a peak detector 265. The output of the peak detector is coupled to a latch 266 whose output is one input to a comparator 267. The other input to comparator 267 is a predetermined reference level. The output of comparator 267 is the other input to the AND gate 268. The zero crossing that results in a new count also enables read-out by the peak detector 265, resets the peak detector, and enables read-in by the latch.

In operation, the circuit 260 produces an output when the just-completed half-cycle has a duration outside the range 7.5 to 9.0 ms and the peak voltage output during said half-cycle indicates a primary current of at least a certain predetermined peak value. In the present embodiment, this is used as an indication of a high probability of a substantial current offset at the transformer primary. The control signal will be present during the subsequent half-cycle, and will operate to discharge the capacitor C1 to prevent saturation of the input amplifier 221. The control signal will persist, on a half-cycle lagging basis, for as long as both necessary conditions are present. In particular, it is seen that arrival of a new count (immediately after occurrence of a zero-crossing) will reset the peak detector 265, and the previously stored peak will be read and held by latch 266 for comparison with the reference by comparator 267. Also, if the count is outside the prescribed limit, one of the comparators 261 or 262 will produce an output which will, in turn, result in a high output from OR gate 263, at least until the next count arrives. Thus, the output of AND gate 268 will be present for every half-cycle that immediately succeeds a half-cycle during which the indicated conditions are present. It will be understood that for counts longer than 9.0 ms, a specified maximum count can be used or a separate timer can be utilized to trigger an output when a predetermined time has been exceeded.

The invention has been described with reference to a particular preferred embodiment, but variations within the spirit and scope of the invention will occur to those skilled in the art. For example, it will be understood that other techniques can be used to obtain the output signal, for example more directly from the signal sensed at the sense winding. Also, it will be recognized that other suitable techniques can be utilized for sensing the presence of offsets at the transformer primary, and that other circuit arrangements can be utilized to implement discharging of the capacitor when offsets of a particular magnitude are detected. Applicant's have noted that there are various ways in which the control signal can be successfully applied (for example, based on continuously updated half-cycle application, as shown, or for a specific period after detection of the offset, etc.). The duration of the control signal is found to not be critical, as long as there is sufficient discharge of the capacitor upon occurrence of a substantial offset. Further, while an embodiment has been described in terms of a current transformer circuit, the principles of the invention are also applicable to potential transformer circuits.

We claim:

1. A transformer circuit apparatus for receiving an input signal and generating an output signal representative of the input signal, comprising:

a transformer having a primary winding for receiving said input signal, a sense winding, and a feedback winding;

first circuit means, coupled to said sense winding and responsive to the magnetic flux sensed by the sense winding, for applying a signal to the feedback winding that tends to reduce the flux sensed by the sense winding;

means coupled to said sense winding for producing an output signal as a function of the magnetic flux sensed by the sense winding;

feedback circuit means, including a low-pass filter, for feeding back a signal that depends on said output signal to said first circuit means;

means for determining the presence of input signal offsets, and for generating offset indication signals in response thereto; and control means responsive to the offset indication signals for controlling said low-pass filter.

2. Apparatus as defined by claim 1, wherein said low-pass filter includes a capacitor, and wherein said control means comprises means for discharging said capacitor.

3. Apparatus as defined by claim 2, wherein said means for discharging said capacitor comprises a switch controlled by said offset indication signals.

4. Apparatus as defined by claim 1, wherein said means for generating offset indication signals comprises means for producing signals which depend upon the time between zero-crossings of said input signal.

5. Apparatus as defined by claim 3, wherein said means for generating offset indication signals comprises means for producing signals which depend upon the time between zero-crossings of said input signal.

6. Apparatus as defined by claim 4, wherein said means for generating offset indication signals is also responsive to the amplitude of the input signal.

7. Apparatus as defined by claim 5, wherein said means for generating offset indication signals is also responsive to the amplitude of the input signal.

8. Apparatus as defined by claim 1, wherein said means coupled to said sense winding for producing an output signal comprises an output circuit coupled to said sense winding via said first circuit means and said feedback winding.

9. Apparatus as defined by claim 3, wherein said means coupled to said sense winding for producing an output signal comprises an output circuit coupled to said sense winding via said first circuit means and said feedback winding.

10. Apparatus as defined by claim 7, wherein said means coupled to said sense winding for producing an output signal comprises an output circuit coupled to said sense winding via said first circuit means and said feedback winding.

11. Apparatus as defined by claim 9, wherein said first circuit means comprises an amplifier coupled to said sense winding, and wherein said feedback circuit means is coupled to said input amplifier.

12. Apparatus as defined by claim 11, wherein said amplifier comprises an operational amplifier having an inverting input terminal and a non-inverting input terminal, the non-inverting input terminal of said operational amplifier being coupled to the sense winding of said transformer, and the inverting input terminal of said operational amplifier being coupled to said feedback circuit means.

13. Apparatus as defined by claim 12, wherein said low-pass filter comprises a resistor coupled between said output circuit and the inverting input terminal of said operational amplifier, and a capacitor coupled between the inverting input terminal of said operational amplifier and ground reference potential.

14. For use in a transformer circuit apparatus which receives an input signal and generates an output signal representative of the input signal, said apparatus including: a transformer having a primary winding for receiving said input signal, a sense winding, and a feedback winding; first circuit means, including an amplifier, coupled to said sense winding and responsive to the magnetic flux sensed by the sense winding, for applying a signal to the feedback winding that tends to reduce the flux sensed by the sense winding; means coupled to said sense winding for producing an output signal as a function of the magnetic flux sensed by the sense winding; and feedback circuit means, including a low-pass filter, for feeding back a signal that depends on said output signal to the amplifier of said first circuit means; a method for preventing saturation of said amplifier, comprising the steps of:

determining the presence of input signal offsets, and generating offset indication signals in response thereto; and controlling said low-pass filter in response to said offset indication signals.

15. The method as defined by claim 14, wherein said low-pass filter includes a capacitor, and wherein said controlling step comprises discharging said capacitor.

16. A transformer circuit apparatus for receiving an input current signal and generating an output voltage signal representative of the input signal, comprising:

a transformer having a primary winding for receiving said input signal, a sense winding, and a feedback winding;

first circuit means, coupled to said sense winding and responsive to the magnetic flux sensed by the sense winding, for applying a signal to the feedback winding that tends to reduce the flux sensed by the sense winding, said first circuit means including an amplifier;

output circuit means coupled to said feedback winding for producing an output voltage signal as a function of the signal applied to said feedback winding;

feedback circuit means, including a low-pass filter, for feeding back a signal that depends on said output signal to the amplifier of said first circuit means;

means for determining the presence of input signal offsets, and for generating offset indication signals in response thereto; and control means responsive to the offset indication signals for controlling said low-pass filter.

17. Apparatus as defined by claim 16, wherein said low-pass filter includes a capacitor, and wherein said control means comprises means for discharging said capacitor.

18. Apparatus as defined by claim 17, wherein said means for discharging said capacitor comprises a switch controlled by said offset indication signals.

19. Apparatus as defined by claim 16, wherein said means for generating offset indication signals comprises means for producing signals which depend upon the time between zero-crossings of said input signal.

20. Apparatus as defined by claim 18, wherein said means for generating offset indication signals comprises means for producing signals which depend upon the time between zero-crossings of said input signal.

21. Apparatus as defined by claim 19, wherein said means for generating offset indication signals is also responsive to the amplitude of the input signal.

22. For use in a transformer circuit apparatus which receives an input current signal and generates an output voltage signal representative of the input signal, said apparatus including: a transformer having a primary winding for receiving said input signal, a sense winding, and a feedback winding; first circuit means, coupled to said sense winding and responsive to the magnetic flux sensed by the sense winding, for applying a signal to the feedback winding that tends to reduce the flux sensed by the sense winding, said first circuit means including an amplifier; output circuit means coupled to said feedback winding for producing an output voltage signal as a function of the signal applied to said feedback winding; and feedback circuit means, including a low-pass filter, for feeding back a signal that depends on said output signal to the amplifier of said first circuit means; a method for preventing saturation of said amplifier, comprising the steps of:

determining the presence of input signal offsets, and generating offset indication signals in response thereto; and controlling said low-pass filter in response to said offset indication signals.

23. The method as defined by claim 22, wherein said low-pass filter includes a capacitor, and wherein said controlling step comprises discharging said capacitor.

* * * * *